(12) United States Patent
Idera et al.

(10) Patent No.: US 11,003,055 B2
(45) Date of Patent: May 11, 2021

(54) IMAGING APPARATUS

(71) Applicant: CANON KABUSHIKI KAISHA, Tokyo (JP)

(72) Inventors: Shuichi Idera, Kawasaki (JP); Honkai Tomimoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/797,141

(22) Filed: Feb. 21, 2020

(65) Prior Publication Data

US 2020/0272029 A1 Aug. 27, 2020

(30) Foreign Application Priority Data

Feb. 27, 2019 (JP) .............................. JP2019-034341

(51) Int. Cl.
| | |
|---|---|
| *G03B 17/02* | (2021.01) |
| *G03B 17/56* | (2021.01) |
| *H02J 50/10* | (2016.01) |
| *H04N 5/225* | (2006.01) |
| *H04N 5/232* | (2006.01) |

(52) U.S. Cl.
CPC ........... *G03B 17/02* (2013.01); *G03B 17/561* (2013.01); *H02J 50/10* (2016.02); *H04N 5/22521* (2018.08); *H04N 5/232411* (2018.08)

(58) Field of Classification Search
None
See application file for complete search history.

(56) References Cited

U.S. PATENT DOCUMENTS

| | | | | | |
|---|---|---|---|---|---|
| 4,901,146 | A | * | 2/1990 | Struhs | G08B 13/19626 348/151 |
| 6,141,052 | A | * | 10/2000 | Fukumitsu | H04N 5/2251 348/373 |
| 6,639,625 | B1 | * | 10/2003 | Ishida | H04N 5/2624 348/218.1 |
| 7,209,164 | B2 | * | 4/2007 | Nishimura | H04N 13/239 348/207.99 |
| 7,909,521 | B2 | * | 3/2011 | Son | G03B 17/00 396/428 |
| 8,113,907 | B2 | * | 2/2012 | Liu | A63H 3/40 446/343 |
| 8,405,765 | B2 | * | 3/2013 | Lin | H04N 5/2257 348/373 |
| 9,444,983 | B2 | * | 9/2016 | Liu | G08B 13/19632 |
| 10,533,876 | B2 | * | 1/2020 | Ghannam | B60S 1/62 |

(Continued)

FOREIGN PATENT DOCUMENTS

JP    2016-085418 A    5/2016

*Primary Examiner* — William B Perkey
(74) *Attorney, Agent, or Firm* — Cowan, Liebowitz & Latman, P.C.

(57) ABSTRACT

An imaging apparatus includes a movable unit, a fixed unit configured to hold the movable unit, and an exterior cover configured to house the movable unit and the fixed unit. The movable unit includes an imaging unit including a lens unit and a first image sensor, and a holder configured to rotatably hold the imaging unit. The holder includes a driver configured to rotate the imaging unit while compressively contacting imaging unit. The exterior cover includes a pressurizer configured to hold the imaging unit while compressively contacting the imaging unit.

11 Claims, 6 Drawing Sheets

(56) References Cited

U.S. PATENT DOCUMENTS

| | | | |
|---|---|---|---|
| 2005/0122419 A1* | 6/2005 | Yoon | H04N 5/2251 348/360 |
| 2008/0056709 A1* | 3/2008 | Huang | G03B 17/561 396/427 |
| 2008/0079847 A1* | 4/2008 | Kung | H04N 5/2254 348/373 |
| 2012/0045197 A1* | 2/2012 | Jones | G03B 37/02 396/427 |
| 2015/0198866 A1* | 7/2015 | Huang | G03B 17/02 348/151 |
| 2017/0104951 A1* | 4/2017 | Wada | H04N 5/38 |
| 2017/0307964 A1* | 10/2017 | Okamoto | G03B 17/02 |
| 2020/0192055 A1* | 6/2020 | Nemoto | H02N 2/103 |
| 2020/0213495 A1* | 7/2020 | Fujimoto | B06B 1/0207 |
| 2020/0272029 A1* | 8/2020 | Idera | H04N 5/22521 |
| 2020/0307825 A1* | 10/2020 | Bruchmann | H04N 5/2253 |
| 2020/0329183 A1* | 10/2020 | Onaka | G02B 7/08 |

* cited by examiner

IMAGING APPARATUS

BACKGROUND OF THE INVENTION

Field of the Invention

The present invention relates to an imaging apparatus having a rotatable lens unit.

Description of the Related Art

A compact imaging apparatus, such as an action-cam (action camera) and a wearable camera, have recently been widespread. Such an imaging apparatus can be attached to a body via an accessory and can provide hands-free imaging. In many cases, it has a structure that prevents water from entering its inside for imaging in a wide variety of scenes and weathers.

Japanese Patent Laid-Open No. ("JP") 2016-85418 discloses an imaging apparatus used for a surveillance camera or the like in which a lens unit is rotatable around each of two orthogonal axes.

The imaging apparatus disclosed in JP 2016-85418 provides a screw fastener that fixes a dome cover (exterior cover) that covers the lens unit and a body holder, to the outside of the exterior cover, and cannot maintained the sealed structure. In other words, the imaging apparatus disclosed in JP 2016-85418 does not have a waterproof performance.

SUMMARY OF THE INVENTION

The present invention provides a waterproof imaging apparatus having a rotatable lens unit.

An imaging apparatus according to one aspect of the present invention includes a movable unit, a fixed unit configured to hold the movable unit, and an exterior cover configured to house the movable unit and the fixed unit. The movable unit includes an imaging unit including a lens unit and a first image sensor, and a holder configured to rotatably hold the imaging unit. The holder includes a driver configured to rotate the imaging unit while compressively contacting imaging unit. The exterior cover includes a pressurizer configured to hold the imaging unit while compressively contacting the imaging unit.

Further features of the present invention will become apparent from the following description of exemplary embodiments with reference to the attached drawings.

DESCRIPTION OF THE EMBODIMENTS

Figure 1:
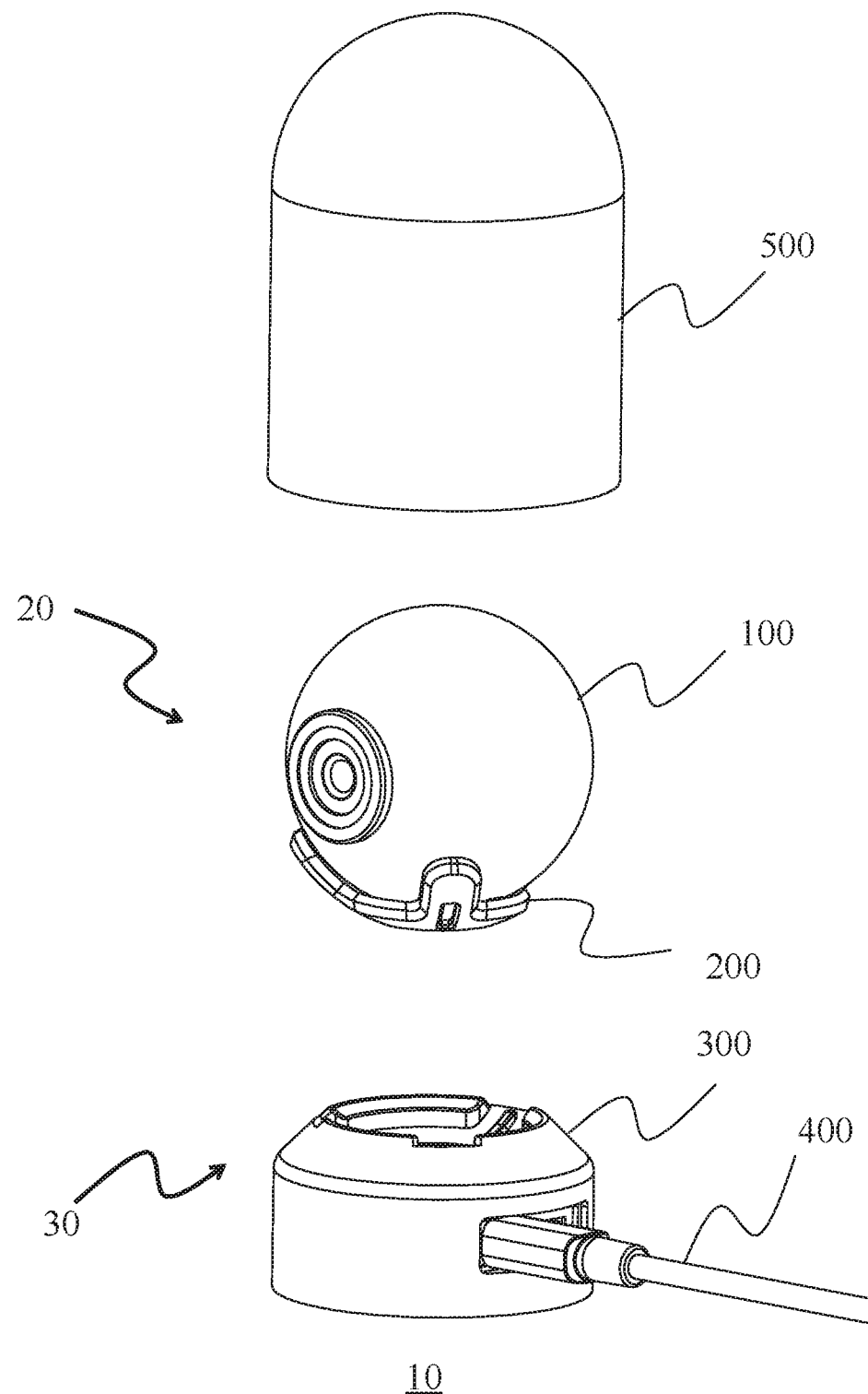
FIG. 1 is an exploded perspective view of an imaging apparatus according to one embodiment of the present invention.

Referring now to the accompanying drawings, a detailed description will be given of embodiments according to the present invention. Corresponding elements in respective figures will be designated by the same reference numerals, and a duplicate description thereof will be omitted.

This embodiment will discuss a digital camera as an illustrative imaging apparatus according to the present invention, but the present invention is not limited to this embodiment. The present invention is widely applicable to an imaging apparatus capable of imaging a plurality of ranges by driving a unit including a lens and an image sensor through an actuator.

FIG. 1 is an exploded perspective view of an imaging apparatus 10 according to one embodiment of the present invention. FIG. 1 illustrates only part necessary to explain the present invention.

The imaging apparatus 10 includes a movable housing (movable unit) 20, a fixed housing (fixed unit) 30, and an exterior cover 500. The movable housing 20 includes an imaging unit 100 and a holding cover (holder) 200 and is configured to be attached to and detachable from the fixed housing 30. The imaging unit 100 has a spherical shape and is rotatably held by the holding cover 200.

The fixed housing 30 has a fixed unit 300 and a cable 400. The fixed unit 300 is configured so that the cable 400 can be connected and disconnected. The fixed unit 300 has, for example, a connector opening that can be attached to a cable supporting the USB (Universal Serial Bus) standard, the HDMI (registered trademark) (High-Definition Multimedia Interface) standard, or the like. The cable 400 is fixed to and held by the fixed unit 300 by attaching one end of the cable to the connector opening formed in the fixed unit 300. The other end of the cable 400 is connected to a different external device such as a PC, a display unit, and an information terminal. In this embodiment, the imaging apparatus 10 can communicate information with an external device via the cable 400. The imaging apparatus 10 may communicate information with an external device using another method. For example, a wireless communication module with an external device may be installed in the fixed unit 300, and the imaging apparatus 10 may wirelessly communicate information with the external device. One end of the cable 400 may be a pin jack plug shape, for example, and the cable 400 may be a cable that supplies power to the fixed unit 300.

The exterior cover 500 is a colorless and transparent member that houses the movable housing 20 and the fixed housing 30. Since the exterior cover 500 has a sealed structure, the exterior cover 500 makes the inside waterproof.

Figure 2:
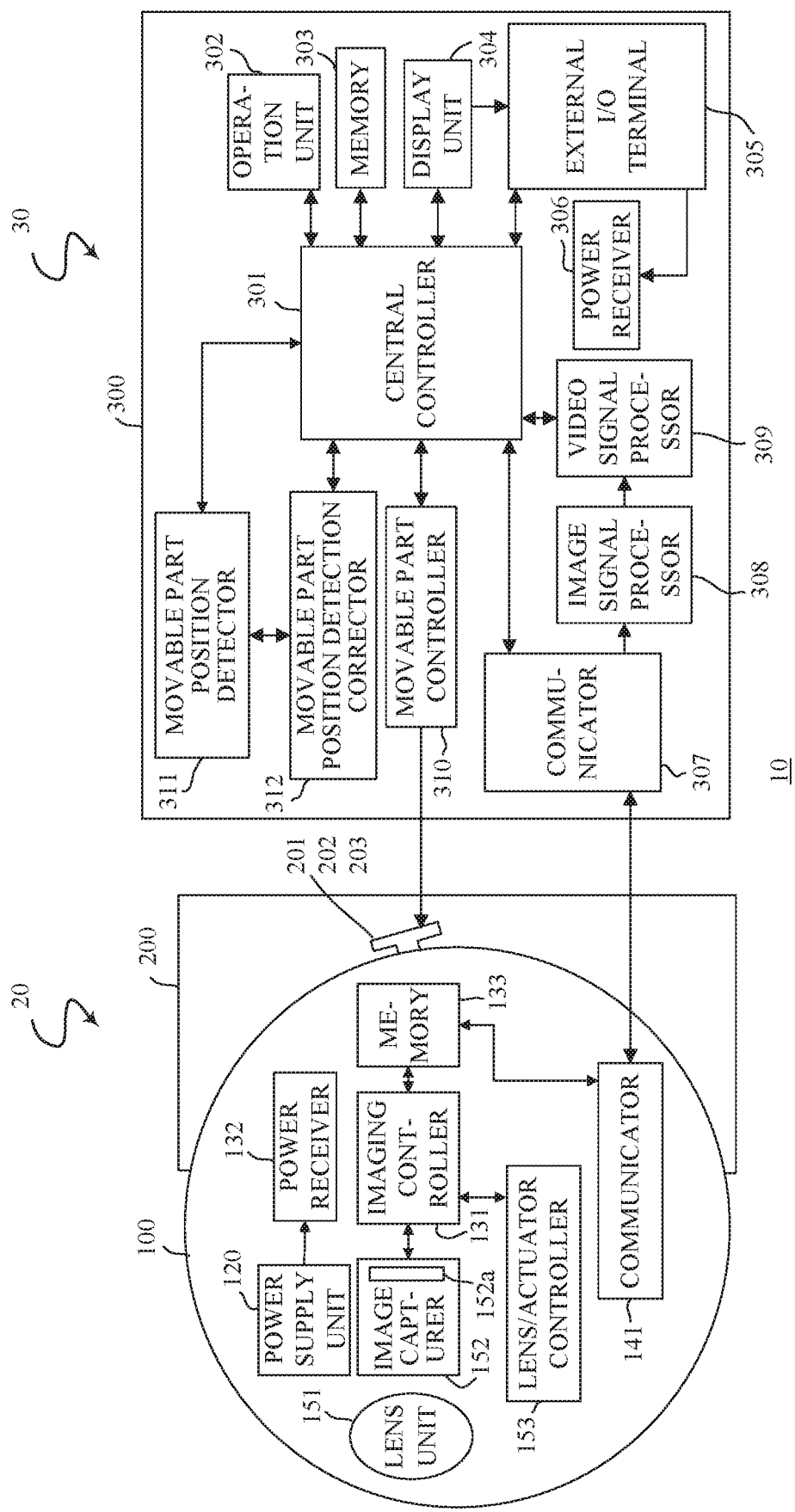
FIG. 2 is a block diagram of the imaging apparatus.

Referring now to FIG. 2, a description will be given of an internal configuration of the imaging apparatus 10. FIG. 2 is a block diagram of the imaging apparatus 10.

The movable housing 20 includes a power supply unit 120, an imaging controller 131, a power receiver 132, a memory 133, a communicator 141, a lens unit 151, an image capturer 152, and a lens/actuator controller 153. The lens unit 151 includes at least one lens and a holder that holds the lens. The lens unit 151 may have a zoom lens mechanism, an aperture/shutter mechanism, an autofocus mechanism, and the like. The image capturer 152 includes an image sensor (first image sensor) 152a, such as a CMOS sensor and a CCD sensor, photoelectrically converts an optical image formed by the lens unit 151, and outputs an electrical signal. The imaging controller 131 processes the electrical signal output from the image capturer 152 into predetermined image data, and causes the memory 133 to store the processed image data. The stored image data is transferred to the communicator 141. The communicator 141 includes a transmission/reception antenna, and communicates data between the movable housing 20 and the fixed housing 30 by the wireless communication. The lens/actuator controller 153 includes a motor driver IC, and drives and controls various actuators of the lens unit 151 based on the driving instruction information received via the communicator 141. The power receiver 132 receives the power from the power supply unit 120 and supplies the received power to each component in the imaging unit 100.

The holding cover 200 includes vibrators (drivers) 201, 202, and 203.

The fixed housing 30 includes a central controller 301, an operation unit 302, a memory 303, a display unit 304, an external input/output (I/O) terminal unit 305, a power receiver 306, a communicator 307, an image signal processor 308, a video signal processor 309, a movable part controller 310, a movable part position detector 311, and a movable part position detection corrector 312. The central controller 301 is a CPU (central processing unit) that controls the entire imaging apparatus 10. The communicator 307 wirelessly communicates data between the movable housing 20 and the fixed housing 30 such as receiving the imaging data from the movable housing 20 and transmitting the driving instruction signal to various actuators in the lens unit 151. The image signal processor 308 converts an electrical signal output from the image capturer 152 and passing through the communicator 307 into a video signal. The video signal processor 309 processes the video signal output from the image signal processor 308 into predetermined image data according to the application. The processing of the video signal includes an electronic image stabilization operation by image cutting and rotation processing. The operation unit 302 is provided for operating the imaging apparatus 10. The memory 303 records various data such as video information acquired by imaging. Based on the signal output from the video signal processor 309, the display unit 304 outputs the video signal to an external display such as an LCD (Liquid Crystal Display) and an organic EL (Electro-Luminescence) display, as necessary. The external input/output terminal unit 305 inputs and outputs a communication signal and a video signal to and from external devices. The external input/output terminal unit 305 receives external power supply as necessary. When the external input/output terminal unit 305 receives an external power supply, the power receiver 306 receives the power from the external input/output terminal unit 305 and supplies the received power to each component in the imaging apparatus 10. The movable part position detector 311 is a position detector including an irradiation light source and a position detecting image sensor. The movable part controller 310 moves (displaces) the imaging unit 100 by applying a voltage to the electromechanical energy conversion elements of the vibrators 201, 202, and 203. The movable part controller 310 properly drives and controls the vibrators 201, 202, and 203, thereby realizing multi-freedom-degree driving of the imaging unit 100. When the movable part position information is included in the image information acquired by the movable part position detector 311, the movable part position detection corrector 312 corrects a position detection of the imaging unit 100.

In this embodiment, each component in the imaging unit 100 is operated by the power from the power supply unit 120, but the present invention is not limited to this embodiment. For example, a wireless power feeding mechanism may be configured between the fixed housing 30 and the movable housing 20, and the power may be supplied from the fixed housing 30 to the imaging unit 100. The data transmissions and receptions of the control signals and the image signals from the fixed housing 30 to the imaging unit 100 may be wired communication instead of the wireless communication.

Figure 3A:
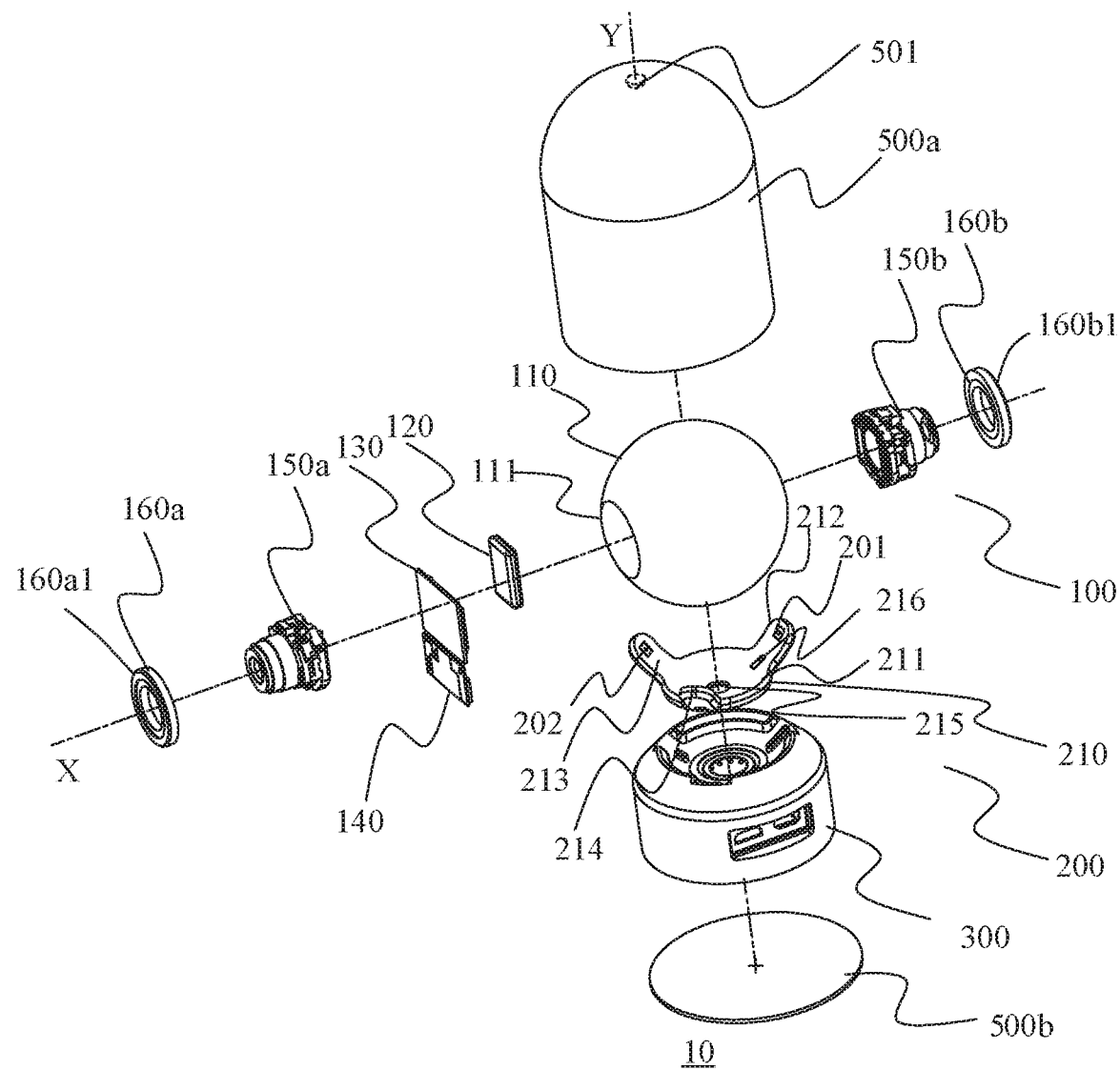
FIG. 3A is an exploded perspective view of an internal structure of a movable housing.
Figure 3B:
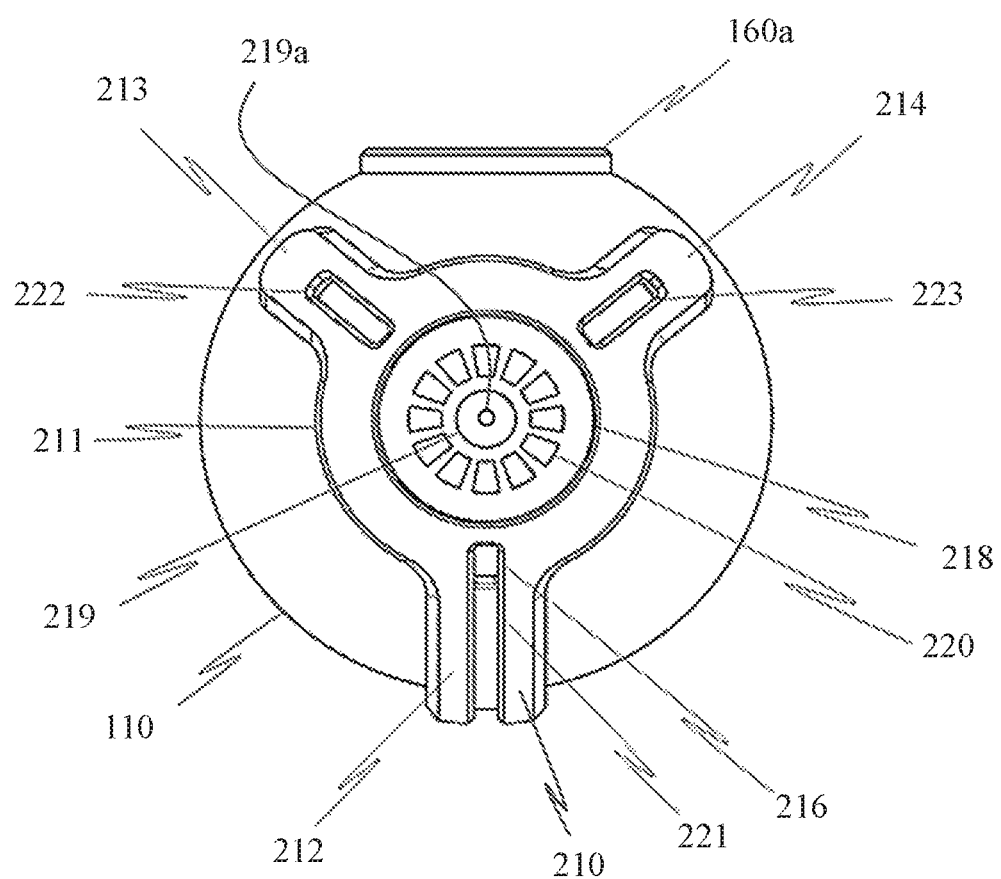
FIG. 3B illustrates the movable housing viewed from a holding cover side.

Referring now to FIGS. 3A and 3B, a description will be given of the structure of the movable housing 20. FIG. 3A is an exploded perspective view illustrating the internal structure of the movable housing 20. FIG. 3B illustrates the movable housing 20 viewed from the holding cover 200 side.

A description will now be given of the imaging unit 100. In this embodiment, the imaging unit 100 includes lens barrels 150a and 150b. The lens barrels 150a and 150b are units each including a lens unit 151 and an image capturer 152, and electrically connected to an imaging control board 130. The lens barrels 150a and 150b are different from each other in directions of the lens surfaces by 180° when the optical axes of the lens units are aligned with each other. In this embodiment, two lens barrels are provided in the imaging unit 100, but the present invention is not limited to this embodiment. For example, one lens barrel may be provided in the imaging unit 100. Where one lens barrel is provided, a spacer having the same weight as the provided lens barrel may be provided in an empty space for the weight balance.

The imaging control board 130 includes an imaging controller 131, a memory 133, a lens/actuator controller 153, and a power receiver 132. The power supply unit 120 is, for example, a lithium ion battery, is chargeable and electrically connected to the imaging control board 130. The wireless communicator 140 includes a communicator 141 and is electrically connected to the imaging control board 130. A hole 111 is formed in a rotor 110. The power supply unit 120, the imaging control board 130, the wireless communicator 140, and the lens barrels 150a and 150b are fixed to an unillustrated holder and then mounted in the hole 111. Thereafter, caps 160a and 160b are respectively attached to the front surfaces of the lens barrels 150a and 150b, whereby the imaging unit 100 is completed. The rotor 110 is made of a stainless material or the like, and receives a hardening process such as a nitriding process as a surface treatment.

A description will now be given of the holding cover 200. The holding cover 200 mainly includes a holder 210. The holder 210 includes a mount 211 that receives the rotor 110 and arm portions 212, 213, and 214 that extend from the mount 211. The arm portions 212, 213, and 214 are formed in an arm shape and include part of the imaging unit 100. The mount 211 includes a rotation restrictor 215 and an opening 216. The rotation restrictor 215 is formed at the center portion of the mount 211 and configured to be partially exposed to the rotor 110 side as an exposed portion. The surface of the exposed portion of the rotation restrictor 215 is made of an elastic material or a sheet material such as ethylene propylene diene rubber (EPDM) or silicon rubber. The vibrators 201, 202, and 203 are disposed on the arm portions 212, 213, and 214, respectively, so as to partially expose. Groove portions 221, 222, and 223 are formed on the outer circumferential sides of the arm portions 212, 213, and 214. In this embodiment, the holder 210 is assembled after the imaging unit 100 is placed on the mount 211. The holding cover 200 rotatably holds the imaging unit 100 without dropping it off.

The exterior cover 500 has an upper exterior cover 500a and a lower exterior cover 500b. When the upper exterior cover 500a and the lower exterior cover 500b are combined, the exterior cover 500 has a sealed structure. Thus, attaching the exterior cover 500 can make the internal parts waterproof. The exterior cover 500 can be attached to and detached from the imaging apparatus 10 and does not affect the imaging of the imaging apparatus 10. Therefore, when the exterior cover 500 is damaged, it may be replaced with another exterior cover 500. A pressurizer 501 that protrudes inwardly (to the side toward the imaging unit 100) is provided inside the exterior cover 500. The pressurizer 501 directly contacts the rotor 110. The rotor 110 is held at four points or the vibrators 201, 202, and 203 and the pressurizer 501. The pressurizer 501 is disposed at a position facing the vibrators 201, 202, and 203, and holds the imaging unit 100 at a certain position while receiving the pressures from the vibrators 201, 202, and 203. With such a configuration, the pressure contact state of the vibrators 201, 202, and 203 with the imaging unit 100 can be stably maintained.

The pressurizer 501 may be integrated with the exterior cover 500 using a transparent resin material such as acrylic, and may be made of polyacetal (POM) or a rolling member advantageous to low-friction sliding in order to reduce a friction during the rotation of the imaging unit 100. The pressurizer 501 may contact the rotor 110 at one point, or may contact at a plurality of points.

A terminal 218 is provided at a portion of the mount 211 that comes into contact with the fixed housing 30. The terminal 218 is fixed to the holder 210 so as to be slidable by a predetermined amount in the spherical center direction of the rotor 110. An attracted portion 219 is provided at the center of the terminal 218. The surface of the attracted portion 219 is made of a ferromagnetic material such as iron, for example. A plurality of electronic contacts 220 are provided around the attracted portion 219. The surface of the electronic contact 220 has received a surface treatment such as gold plating or tin plating. A hole 219a is provided in the central portion of the attracted portion 219 for sucking out the abrasion powders generated when the rotor 110 is driven and frictions occur among the vibrators 201, 202, and 203 and the rotor 110.

Figure 4A:
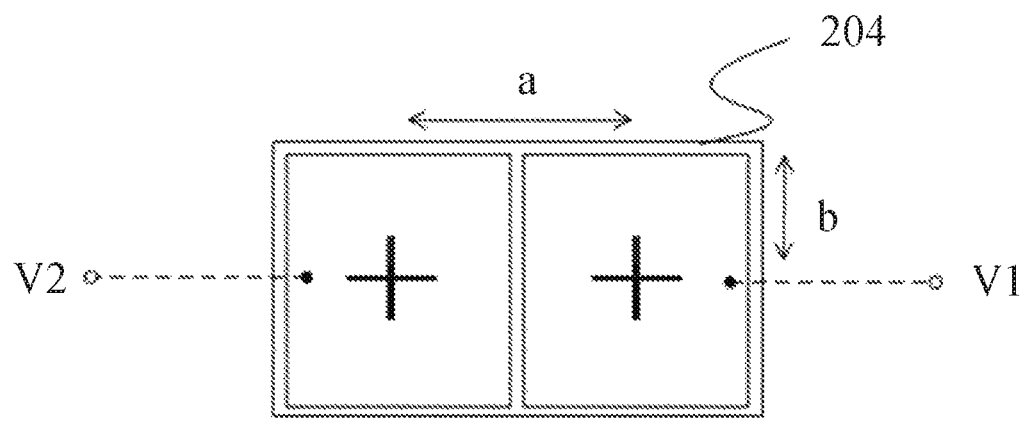
FIGS. 4A to 4C schematically explain a driving principle of a vibrator.
Figure 4B:
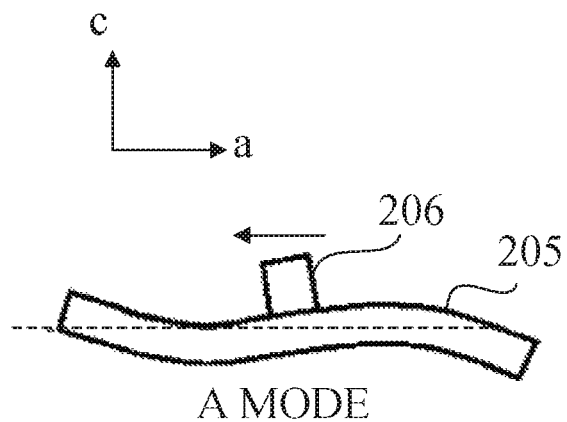
Figure 4C:
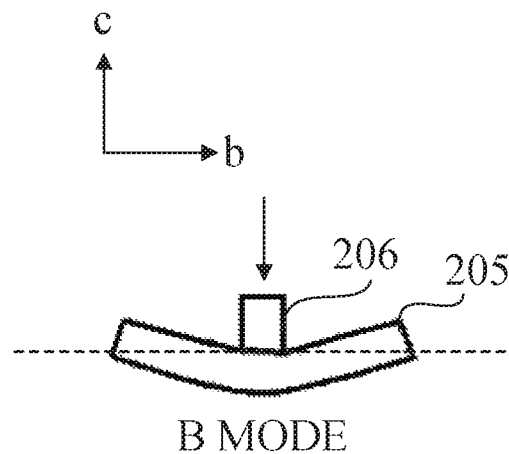

Referring now to FIGS. 4A to 4C, a description will be given of a driving principle of the driving source according to this embodiment. FIGS. 4A to 4C are schematic diagrams for explaining the driving principle of the vibrator. In this embodiment, a vibration wave motor is used as a driving source to excite a vibration of a predetermined frequency for the vibrator by applying a high frequency voltage and to drive the rotor by the vibration wave. Each of the vibrators 201, 202, and 203 includes a vibration plate 205 and a piezoelectric element 204 attached to the back surface of the vibration plate 205. The piezoelectric element 204 converts the electrical energy applied from the movable part controller 310 into the mechanical energy.

FIG. 4A illustrates an electrode pattern of the piezoelectric element 204. The piezoelectric element 204 is formed in a rectangular shape, and the electrode area is divided into two equal parts in the longitudinal direction (direction "a"). The polarity in each electrode area is the same (+). Of the two electrode areas, an AC voltage (V1) is applied to the electrode area located on the right side in FIG. 4A, and an AC voltage (V2) is applied to the electrode area located on the left side. In FIG. 4A, where the AC voltages V1 and V2 are AC voltages having a frequency near the resonance frequency of the A mode and phases shifted by 180°, the right electrode area contracts and the left electrode area expands at a certain moment. At another moment, the right electrode area expands and the left electrode area contracts. As a result, the A-mode vibration shown in FIG. 4B occurs in the vibration plate 205. The A mode is a secondary bending mode in the "a" direction, and has three nodes with a small displacement in a "c" direction and two abdominal portions having a large displacement in the c direction. When the A-mode vibration occurs, the tip of the protrusion 206 provided at the center portion of the vibration plate 205 is displaced along the "a" direction.

Where the AC voltages V1 and V2 are AC voltages having the same phases near the resonance frequency of the B mode that is substantially the same as the resonance frequency of the A mode, the two electrode areas extend at a certain moment, and contract at another moment. As a result, the vibration of the B mode shown in FIG. 4C occurs in the vibration plate 205. The B mode is a primary bending mode in a "b" direction, and has two nodes having a small displacement in the "c" direction and one abdomen having a large displacement in the "c" direction. When the B-mode vibration occurs, the tip of the protrusion 206 is displaced along the "c" direction.

By combining each vibration with a certain temporal phase relationship, elliptical motions having diameters in the "a" and "c" directions are formed at the tip of the protrusion 206 in contact with the mover. The mover receives the generated elliptical motion as a frictional force of the vibrator and moves in the arrow direction in FIG. 4B.

An incidence ratio between the A mode and the B mode is adjustable by changing the phase difference between the voltages input to the two electrode areas of the piezoelectric element 204. An aspect ratio of the elliptical locus changes depending on the incidence ratio between the A mode and the B mode. Since the driving force applied to the protrusion 206 is variable by adjusting the incidence ratio between the A mode and the B mode, the speed of the mover can be controlled.

Figure 5:
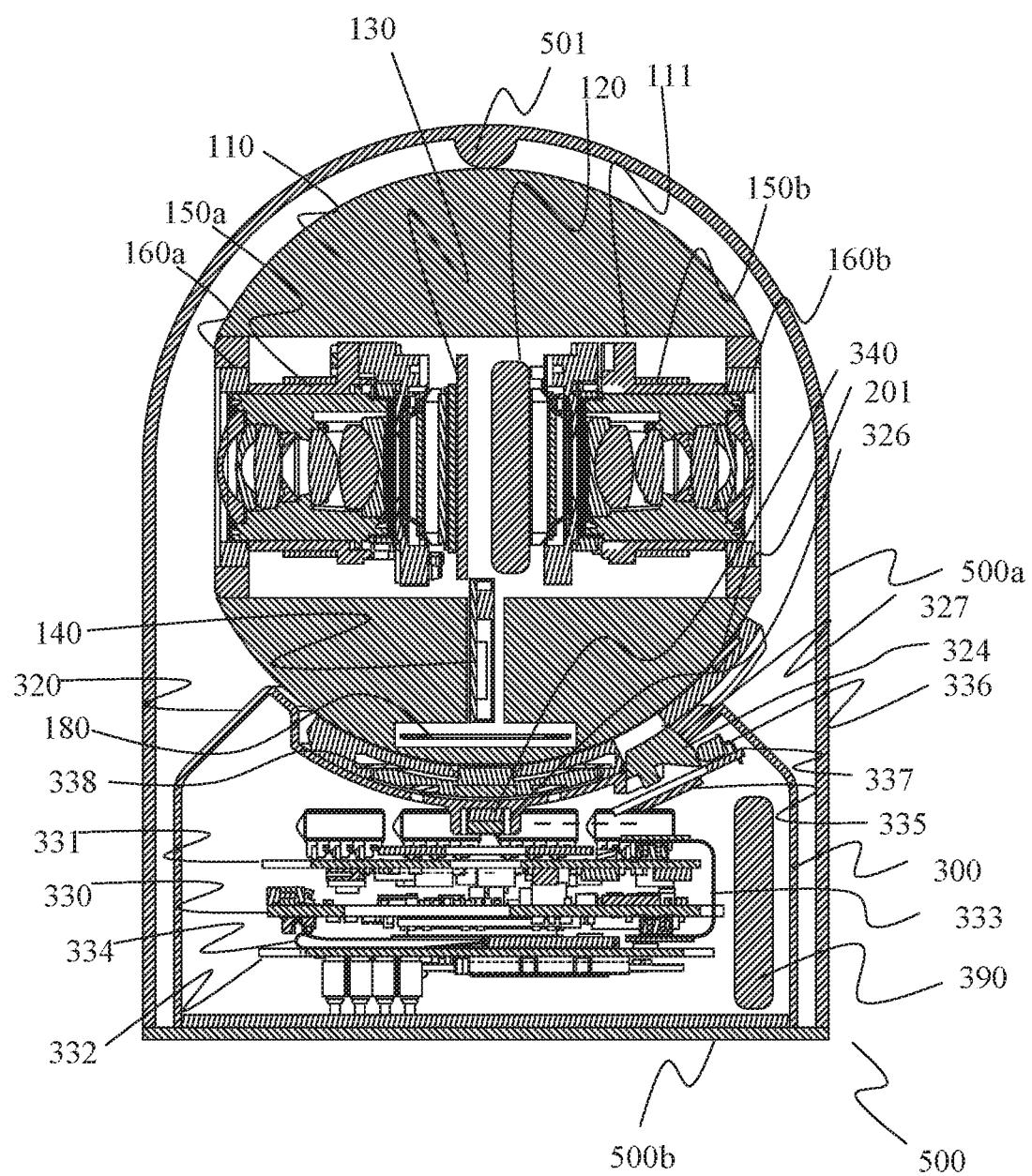
FIG. 5 is a sectional view of an internal structure of the imaging apparatus.

Referring now to FIG. 5, a description will be given of a structure of the imaging apparatus 10. FIG. 5 is a sectional view taken along an XY plane composed of the optical axis X and the axis Y in FIG. 3A and illustrates the internal structure of the imaging apparatus 10.

The power supply unit 120, the imaging control board 130, the wireless communicator 140, and the lens barrels 150a and 150b are provided inside a hole 111 formed in the rotor 110. The wireless communicator 140 is disposed on a substantially central axis of the rotor 110, closer to the exterior portion of the lower surface of the rotor 110, and on the side opposite to the pressurizer 501 side with respect to the center of the rotor 110. Hence, the wireless communication can be easily performed as compared with the case where the wireless communicator 140 is closer to the center of the rotor 110. The wireless power receiving coil 180 is disposed on the approximately center axis of the rotor 110 and closer to the exterior portion than the wireless communicator 140 on the lower surface of the rotor 110. The wireless power receiving coil 180 is supplied with power from the wireless power feeding coil 338 mounted in the fixed housing 30, and can charge the power supply unit 120 with the power. In this embodiment, when the imaging apparatus 10 is not driven in the imaging standby state or a pause mode, the wireless power receiving coil 180 and the wireless power feeding coil 338 are positioned so that they are opposite to each other, and the power supply unit 120 is charged with the power.

The upper exterior cover 500a is provided with the pressurizer 501. The pressurizer 501 is disposed above the center of the rotor 110 (the center of the movable housing 20). As described above, the pressurizer 501 directly contacts the rotor 110, and the rotor 110 is held at the four points or the vibrators 201, 202, and 203 and the pressurizer 501. The vibrators 201, 202, and 203 are disposed below the center of the rotor 110 (the center of the movable housing 20). The pressurizer 501 is disposed at a position facing the vibrators 201, 202, and 203, and holds the imaging unit 100 at a certain position while receiving pressures from the vibrators 201, 202, and 203. With such a configuration, the pressure contact state of the vibrators 201, 202, and 203 with respect to the imaging unit 100 can be stably maintained.

The caps 160a and 160b have black frames (read portions) 160a1 and 160b1 readable by an image sensor (second image sensor) 335 provided in the fixed unit 300 at a position where the angles of view of the lens barrels 150a and 150b do not overlap each other. The black frames 160a1 and 160b1 include slidable sheets to facilitate the sliding performance with the vibrators 201, 202, and 203.

The fixed unit 300 has a cover 320 that houses various electronic components. A hole 327 that is a through-hole is formed in the cover 320. A transmission cover 324 is attached to the hole 327, and fixed to and bonded to the cover 320. The transmission cover 324 is processed by molding, for example, acrylic resin (PMMA) or the like. The image sensor 335 is mounted on a printed circuit board 337 and disposed at a position opposite to the transmission cover 324. A light source 336 is mounted on the printed circuit board 337. The light source 336 may use, for example, a semiconductor element such as a light emitting diode. The printed circuit board 337 is fixed to the cover 320.

A recess 326 is provided at the bottom of the spherical recess of the cover 320. A magnet 340 is accommodated in the recess 326 and fixed to and bonded to the cover 320. The magnet 340 is made of a material having a high magnetic flux density such as a neodymium magnet.

A plurality of printed circuit boards are arranged in parallel inside the cover 320. The plurality of printed circuit boards are fixed to the cover 320. The printed circuit board 330 includes the central controller 301, the memory 303, the display unit 304, the external input/output terminal unit 305, the power receiver 306, the image signal processor 308, the video signal processor 309, and the movable part position detection corrector 312. The printed circuit board 331 is mounted with the movable part controller 310 and electrically connected to the printed circuit board 330 by the flexible printed circuit board 333. The printed circuit board 332 includes the communicator 307 and is electrically connected to the printed circuit board 330 by the flexible printed circuit board 334. Printed circuit boards 330, 331, and 332 are fixed to cover 320.

The electric circuit configuration of the imaging apparatus 10 is roughly divided into a control circuit block accommodated in the imaging unit 100 and a control circuit block accommodated in the fixed unit 300. The control circuit accommodated in the imaging unit 100 is limited to a circuit block relating to imaging and a circuit block for transmitting imaging data to the fixed unit 300. For example, by accommodating a circuit block for detecting the position of the imaging unit 100, a control circuit block for the drive actuator, and the like in the fixed unit 300, the imaging unit 100 can be reduced in size and weight. Making the imaging unit 100 smaller and lighter leads to the improved portability when the user carries the movable housing 20.

When the holding cover 200 is attached to the fixed unit 300, the opening 216 and the transmission cover 324 are arranged at positions opposite to each other. The printed circuit board 337 is disposed directly below the transmission cover 324. The image sensor and the light source 336 are mounted on the printed board 337. The light emitted from the light source 336 is reflected on the inner surface of the transmission cover 324, passes through the opening 216, and reaches the surface of the rotor 110. Part of the light reflected on the surface of the rotor 110 reaches the light receiving surface of the image sensor 335. The image sensor 335 photoelectrically converts the optical image and outputs an electrical signal to the central controller 301. As the imaging unit 100 is rotated, the optical image received by the image sensor 335 is continuously displaced. The image sensor 335 continues to output an electric signal converted from the continuously displacing optical image, to the central controller 301. The central controller 301 can calculate the displacement amount of the rotor 110 based on the acquired information. The movable portion position detection corrector 312 generates correction drive information using part of the position information obtained by the calculation. The central controller 301 transmits the corrected driving information to the movable part controller 310. The movable part controller 310 outputs an actuator drive signal to the vibrators 201, 202, and 203, thereby performing position correction driving of the imaging unit 100. When the black frames 160a1 and 160b1 of the caps 160a and 160b are read by the image sensor 335, the central controller 301 determines that each lens unit of the lens barrels 150a and 150b may contact the pressurizer 501. Therefore, the central controller 301 controls the driving of the rotor 110 so that each lens unit does not contact the pressurizer 501.

As described above, the pressurizer 501 provided on the exterior cover 500 enables the vibration bodies 201, 202, and 203 to be pressed, and the exterior cover 500 covers the imaging apparatus 10, so that the sealed structure of the exterior cover 500 can make the imaging apparatus 10 waterproof.

The above embodiment can provide a waterproof imaging apparatus having a rotatable lens unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-034341, filed on Feb. 27, 2019 which is hereby incorporated by reference herein in its entirety.

What is claimed is:

1. An imaging apparatus comprising:
    a movable unit;
    a fixed unit configured to hold the movable unit; and
    an exterior cover configured to house the movable unit and the fixed unit,
    wherein the movable unit includes:
    an imaging unit including a lens unit and a first image sensor; and
    a holder configured to rotatably hold the imaging unit,
    wherein the holder includes a driver configured to rotate the imaging unit while compressively contacting imaging unit, and
    wherein the exterior cover includes a pressurizer configured to hold the imaging unit while compressively contacting the imaging unit.

2. The imaging apparatus according to claim 1, wherein the driver is provided below a center of the movable unit, and the pressurizer is provided above the center of the movable unit and opposite to the driver.

3. The imaging apparatus according to claim 1, wherein the exterior cover has a sealed structure while housing the movable unit and the fixed unit.

4. The imaging apparatus according to claim 1, wherein the fixed unit includes a second image sensor,
    wherein the movable unit has a read portion readable by the second image sensor, and a cap attached to a front surface of the lens unit; and
    wherein the imaging unit rotates based on reading of the read portion by the second image sensor so that the lens unit does not contact the pressurizer.

5. The imaging apparatus according to claim 4, wherein the read portion includes a slidable member.

6. The imaging device according to claim 1, wherein the fixed unit has a wireless power feeding coil configured to wirelessly feed power,
   wherein the movable unit has a wireless power receiving coil configured to wirelessly receive the power from the wireless power feeding coil, and a power supply unit configured to charge wirelessly received power,
   wherein in charging the power supply unit, the movable unit rotates so that the wireless power receiving coil and the wireless power feeding coil are opposite to each other.

7. The imaging apparatus according to claim 6, wherein the power supply unit is charged when the imaging apparatus is in an imaging standby state.

8. The imaging apparatus according to claim 1, wherein the movable unit includes a wireless communication unit disposed opposite to the pressurizer with respect to the center of the movable unit and configured to transmit and receive data to and from the fixed unit.

9. The imaging apparatus according to claim 1, wherein the holder has a hole for removing abrasion powder generated when the driver and the imaging unit contact each other.

10. The imaging apparatus according to claim 9, wherein the hole is provided at a center of the holder.

11. The imaging apparatus according to claim 1, wherein the imaging unit has a spherical shape.

* * * * *